(12) United States Patent
Shiraishi

(10) Patent No.: US 9,225,180 B2
(45) Date of Patent: Dec. 29, 2015

(54) ELECTRIC STORAGE DEVICE MANAGEMENT APPARATUS AND METHOD OF EQUALIZING CAPACITIES OF ELECTRIC STORAGE DEVICES

(75) Inventor: Takeyuki Shiraishi, Kyoto-shi, Kyoto (JP)

(73) Assignee: GS YUASA INTERNATIONAL LTD., Kyoto-Shi, Kyoto (JP)

(*) Notice: Subject to any disclaimer, the term of this patent is extended or adjusted under 35 U.S.C. 154(b) by 528 days.

(21) Appl. No.: 13/607,299

(22) Filed: Sep. 7, 2012

(65) Prior Publication Data

US 2013/0063089 A1 Mar. 14, 2013

(30) Foreign Application Priority Data

Sep. 9, 2011 (JP) .................................. 2011-197346
Aug. 27, 2012 (JP) .................................. 2012-186549

(51) Int. Cl.
*H02J 7/00* (2006.01)
*B60L 11/18* (2006.01)
*H01M 10/44* (2006.01)
(Continued)

(52) U.S. Cl.
CPC ........... *H02J 7/0016* (2013.01); *B60L 11/1866* (2013.01); *H01M 10/441* (2013.01); *H01M 10/482* (2013.01); *B60L 2240/547* (2013.01); (Continued)

(58) Field of Classification Search
CPC ......... H02J 7/0014; H02J 7/0021; H02J 7/00; H02J 7/0024; H02J 7/0068; H01M 2010/4271; Y02T 10/7044; Y02T 10/92
USPC .................................. 320/107, 127, 130, 134
See application file for complete search history.

(56) References Cited

U.S. PATENT DOCUMENTS 5,825,155 A 10/1998 Ito et al.
5,905,360 A * 5/1999 Ukita ............................ 320/118
(Continued)

FOREIGN PATENT DOCUMENTS

JP 2000-050516 A 2/2000
JP 2002-354698 A 12/2002
(Continued)

OTHER PUBLICATIONS

United States Office Action dated Dec. 29, 2014 in copending U.S. Appl. No. 13/607,288.
(Continued)

*Primary Examiner* — Nghia Doan
(74) *Attorney, Agent, or Firm* — McGinn IP Law Group, PLLC

(57) ABSTRACT

An electric storage device management apparatus is provided for monitoring an electric storage device assembly charged and discharged by a charger/discharger. The electric storage assembly includes a plurality of electric storage devices connected in series. The electric storage device management apparatus includes a voltmeter, a discharging circuit, and a controller. The voltmeter is configured to measure voltages of the electric storage devices respectively. The discharging circuit is configured to discharge the electric storage devices individually. The controller is configured to: determine whether a voltage of each electric storage device has reached a reference voltage during charging or discharging of the electric storage device assembly; and control the discharging circuit to discharge each electric storage device if the voltage of the electric storage device has reached the reference voltage.

7 Claims, 10 Drawing Sheets

(51) Int. Cl.
*H01M 10/48* (2006.01)
*H01M 10/42* (2006.01)

(52) U.S. Cl.
CPC .... *B60L 2240/80* (2013.01); *H01M 2010/4271* (2013.01); *Y02T 10/7055* (2013.01)

(56) References Cited

U.S. PATENT DOCUMENTS

| | | | |
|---|---|---|---|
| 7,880,444 | B2 | 2/2011 | Pellenc |
| 2005/0170256 | A1 | 8/2005 | Cummings |
| 2009/0140694 | A1 | 6/2009 | Zeng |
| 2010/0194339 | A1 | 8/2010 | Yang et al. |
| 2011/0011653 | A1* | 1/2011 | Mizutani et al. ............. 180/65.1 |
| 2011/0267002 | A1 | 11/2011 | Baarman et al. |
| 2012/0161709 | A1* | 6/2012 | Fujii ................... H02J 7/0016 320/118 |
| 2012/0293003 | A1 | 11/2012 | Shimamura et al. |

FOREIGN PATENT DOCUMENTS

| | | |
|---|---|---|
| JP | 2011-019329 A | 1/2011 |
| JP | 2011-041452 A | 2/2011 |
| WO | WO 2011/102241 A1 | 8/2011 |

OTHER PUBLICATIONS

Extended European Search Report dated Feb. 11, 2015 with an English Translation.
United States Office Action dated May 15, 2015 in U.S. Appl. No. 13/607,288.

* cited by examiner

FIG.8

| SEQUENCE | DISCHARGING TIME PERIOD HT / SEC. |
|---|---|
| 1 | 60 |
| 2 | 40 |
| 3 | 20 |
| ⋮ | ⋮ |
| N | 0 |

FIG.10

| SEQUENCE | DISCHARGING TIME PERIOD HT / SEC. |
|---|---|
| N | 60 |
| M | 40 |
| L | 20 |
| ⋮ | ⋮ |
| 1 | 0 |

ELECTRIC STORAGE DEVICE MANAGEMENT APPARATUS AND METHOD OF EQUALIZING CAPACITIES OF ELECTRIC STORAGE DEVICES

CROSS REFERENCE TO RELATED APPLICATION

This application claims priority from Japanese Patent Applications No. 2011-197346 filed on Sep. 9, 2011 and No. 2012-186549 filed on Aug. 27, 2012. The entire content of these priority applications is incorporated herein by reference.

TECHNICAL FIELD

The present invention disclosed in the present specification relates to a technology of equalizing the capacities of a plurality of electric storage devices under charging or discharging.

BACKGROUND

Rechargeable electric storage devices have been used. The electric storage devices can be repeatedly used by charging and discharging. Therefore, the electric storage devices are eco-friendly in comparison to non-rechargeable batteries and thus currently used in various fields including electric vehicles.

A device using a plurality of electric storage devices may encounter a case where capacities of the electric storage devices become unequal due to fluctuations in initial capacity or deterioration rate of them. In charging, one or some of the electric storage device(s) sometimes reach a full-charge voltage earlier or later than the other electric storage devices. Therefore, not all of the electric storage devices can be charged fully. Further, in discharging, one or some of the electric storage devices sometimes reach an end-of-discharge voltage and stop being charged earlier or later than the other electric storage devices. Therefore, not all of the electric storage devices can be fully discharged and exhausted. Thus, if the capacities of the electric storage devices are unequal, those capacities cannot fully be utilized. Conventionally, a technology has been known of discharging the secondary batteries having unequal capacities by using a discharging circuit such as a resistor to equalize their capacities. According to the technology, remaining energy capacities of the secondary batteries are obtained from voltage information of the secondary batteries in a current-less state to discharge those secondary batteries based on their differences in capacity, thereby equalizing the capacities of the secondary batteries.

Recently, an olivine-type lithium-ion iron secondary battery (hereinafter referred to as an olivine-type iron battery) is attracting attention as a secondary battery for use in electric cars. The olivine-type iron battery is a kind of lithium-ion batteries and has a positive electrode including olivine-type iron phosphate and a negative electrode including, for example, a graphite-based material. Therefore, the olivine-type iron battery need not use a cobalt-based electrode as its electrode and has an advantage in that it is more inexpensive and safer than a secondary battery that uses a cobalt-based electrode.

The olivine-type iron battery has a plateau region extending from a point at which a state of charge (SOC) is at a certain level to a point at which the SOC is at another level. The plateau region is defined based on the olivine-type ion battery including a material of the negative electrode. The SOC indicates a remaining capacity of the secondary battery. If the negative electrode includes a graphite-based material, the plateau region may extend from a point at which the SOC is 10% to a point at which the SOC is 90%. In this context, the plateau region refers to a region where the voltage of a secondary battery stays roughly constant irrespective of changes in the SOC of the secondary battery. In the plateau region, it is difficult to estimate capacities of the electric storage devices from voltage information of those elements. Accordingly, to equalize the capacities of the electric storage devices by using the voltage information of those electric storage devices, a technology is desired to equalize the capacities of the electric storage devices by using a region other than the plateau region.

However, the olivine-type iron battery has a region (hereinafter referred to as variation region) in which a voltage sharply increases with respect to an increase in the remaining capacity. In the olivine-type iron battery having a negative electrode including a graphite-based material, regions in which the SOC is lower than 10% and higher than 90% may be the variation region. In the case of electric storage devices such as the secondary batteries having a variation region with such relatively high SOC, during charging for example, even if an attempt is made to equalize the electric storage devices by discharging the electric storage devices based on their voltage information acquired in the variation region, charging of the electric storage devices ends before their equalization ends. According to the conventional technologies, discharging of the electric storage devices would end upon the end of their charging. Thus, the electric storage devices could not be sufficiently discharged and the capacities of the electric storage devices are less likely to be equalized.

SUMMARY

An electric storage device management apparatus described herein is provided for monitoring an electric storage device assembly charged and discharged by a charger/discharger. The electric storage device assembly includes a plurality of electric storage devices connected in series. The electric storage device management apparatus includes a voltmeter, a discharging circuit, and a controller. The voltmeter is configured to measure voltages of the electric storage devices, respectively. The discharging circuit is configured to discharge the electric storage devices individually. The controller is configured to: determine whether a voltage of each electric storage device has reached a reference voltage during charging or discharging of the electric storage device assembly; and control the discharging circuit to discharge each electric storage device if the voltage of the electric storage device has reached the reference voltage.

According to the present invention, it is possible to equalize capacities of a plurality of electric storage devices under charging or discharging.

BRIEF DESCRIPTION OF THE DRAWINGS

FIG. 8 is a relational table indicating relationships between sequential numbers and discharging time periods in the third embodiment;

FIG. 10 is a relational table indicating relationships between sequential numbers and discharging time periods in the fourth embodiment.

DETAILED DESCRIPTION

First Embodiment

A first embodiment will be described with reference to FIGS. 1 to 5.

1. Configuration of a Battery Management System

Figure 1:
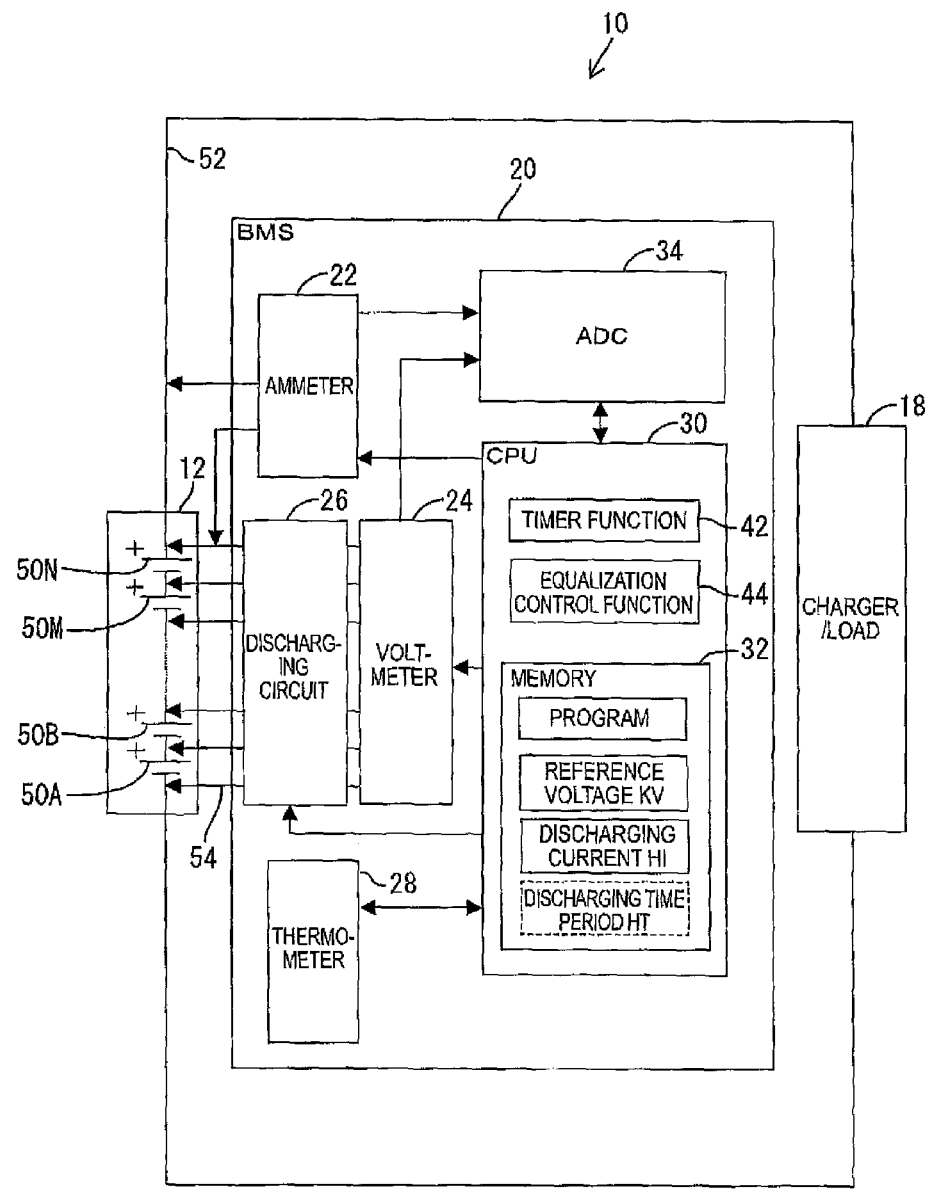
FIG. 1 is a block diagram of a charging and discharging apparatus.

As illustrated in FIG. 1, a charging and discharging system 10 includes a battery assembly 12, a battery management system (EMS) 20, and a charger/load 18. The battery assembly 12 includes a plurality of secondary batteries 50 (electric storage devices) connected in series. The battery assembly 12 is charged when connected to a charger of the charger/load 18, and discharged when connected to a load of the charger/load 18. A remaining capacity of each secondary battery 50 indicates a state of charge (SOC) of the secondary battery 50. The BMS 20 controls the remaining capacity (or the SOC) of each secondary battery 50 by monitoring a voltage V and a current I during charging, and equalizes the SOCs of the secondary batteries 50.

Figure 4:
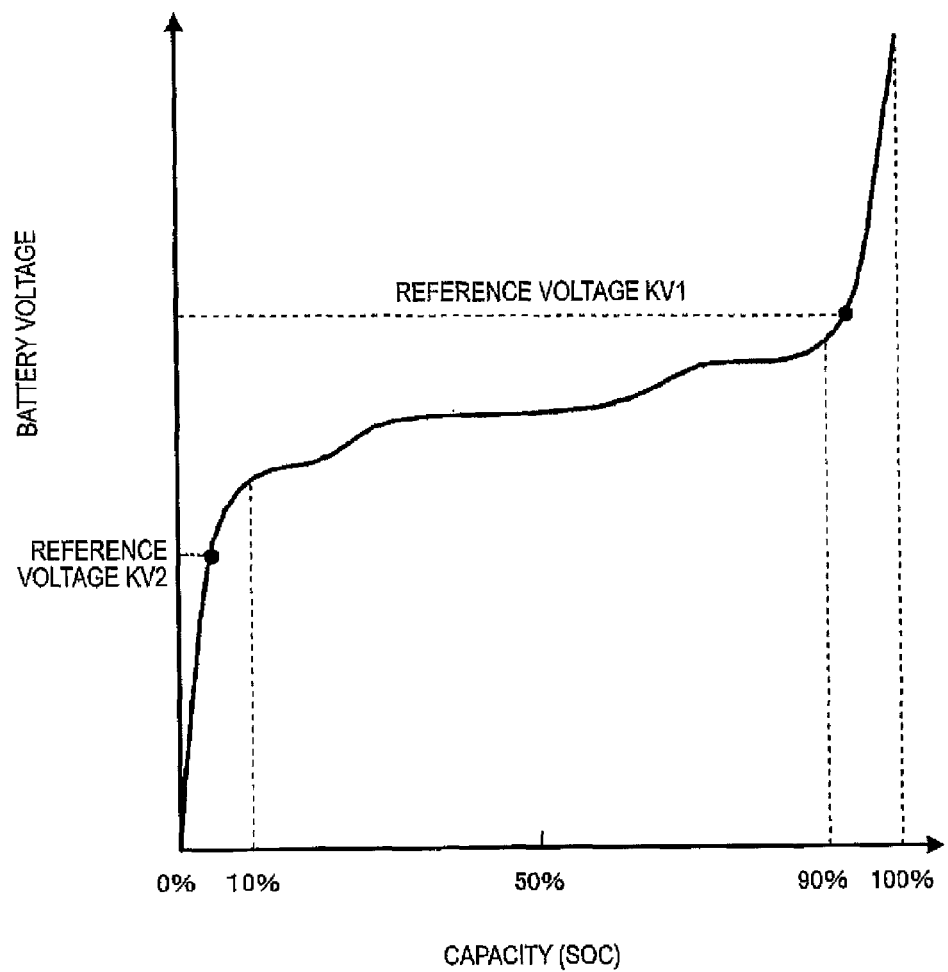
FIG. 4 is a graph illustrating charging and discharging characteristics of secondary batteries.

In this embodiment, olivine-type lithium-ion iron secondary batteries (hereinafter referred to as olivine-type iron batteries) are used for the secondary batteries 50. The secondary batteries 50 are a kind of lithium-ion batteries. A positive electrode and a negative electrode of each secondary battery 50 include olivine type iron phosphate and a graphite material, respectively. As illustrated in FIG. 4, the voltage of the secondary battery 50 sharply rises in a first region in which the SOC is lower than 10% and a second region in which SOC is 90% or higher. The first region is in an early stage of charging (or a final stage of discharging) and the second region is in a final stage of charging (or an early stage of discharging). The voltage of the secondary battery 50 is substantially constant in a third region in which the SOC is in a range from 10% to 90% (hereinafter referred to as a plateau region). The third region is in an intermediate stage of charging or discharging.

The BMS 20 includes a central processing unit (CPU) 30, an analog-digital converter (ADC) 34, an ammeter 22, a voltmeter 24, a discharging circuit 26, and a thermometer 28.

The CPU 30 has a built-in memory (a memory) 32 such as a ROM or RAM. In the memory 32, various kinds of programs for controlling operations of the components of the BMS 20 are stored. The CPU 30 measures time periods and controls the discharging circuit 26. These functions of the CPU 30 are illustrated in FIG. 1 as functional blocks 42 and 44, respectively. The CPU 30 reads the programs from the memory 32 and controls the components in the BMS 20 such as the discharging circuit 26.

Figure 2:
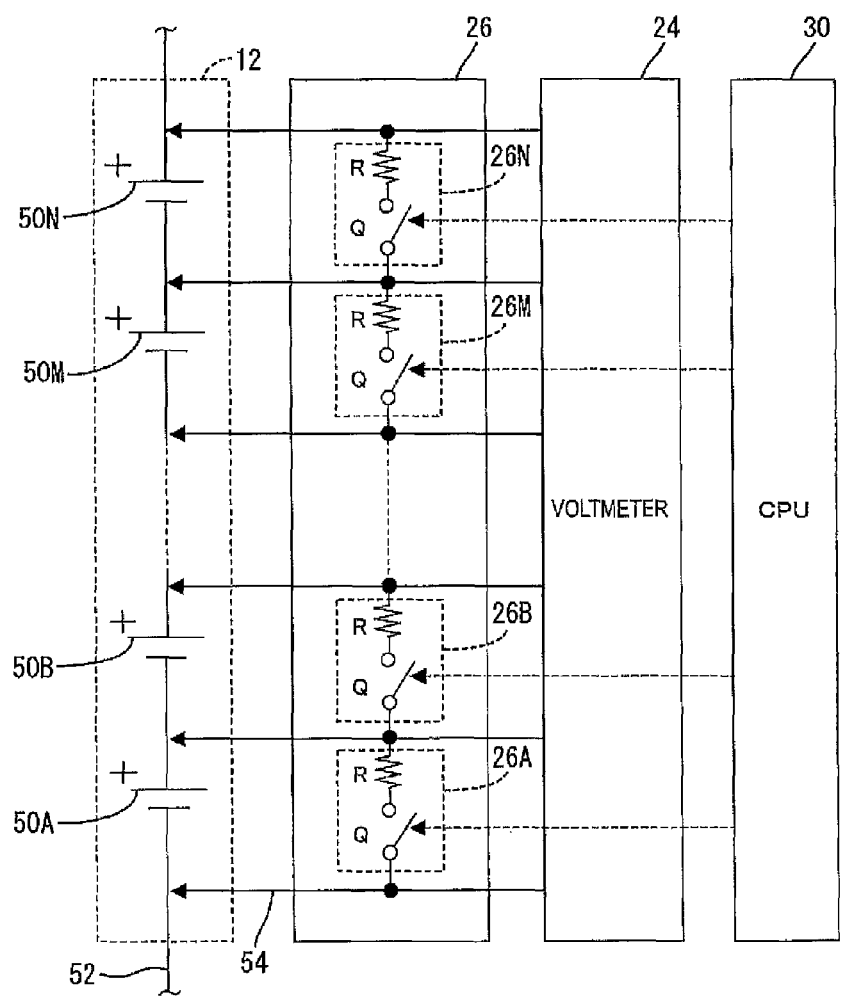
FIG. 2 is a schematic diagram of a discharging circuit.

The thermometer 28 is a contact-type or a non-contact-type thermometer provided for measuring a temperature of the battery assembly 12. The measured temperature is stored in the memory 32. As illustrated in FIG. 2, the voltmeter 24 is connected to both ends of each of the secondary batteries 50 via wirings 54. The voltmeter 24 measures a voltage V of each secondary battery 50 for each predetermined period during charging and discharging. The battery assembly 12 includes multiple secondary batteries 50A, 50B, . . . , and 50N. The voltmeter 24 measures voltages VA, VB, . . . , and VN of the respective secondary batteries 50. The voltmeter 24 sends the measurements of the voltages V to the ADC 34.

The discharging circuit 26 is connected to wirings 54 that connect the voltmeter 24 to the secondary batteries 50. The discharging circuit 26 discharges the secondary batteries 50 individually. As illustrated in FIG. 2, the discharging circuit 26 includes individual discharging circuits 26A, 26B, . . . , and 26N for discharging the secondary batteries 50, respectively. Each individual discharge circuit 26A, 26B, or 26N is connected between the wirings 54. Each individual discharge circuit 26A, 26B, . . . , or 26N includes a resistor R and a switch Q. Closing or opening of the switch Q of the discharging circuit 26 is controlled by the CPU 30. When the switch Q is closed by the CPU 30, a current flows from the secondary battery 50 via the wirings 54 and the resistor R. Therefore, the secondary battery 50 is discharged. When the switch Q is opened, the discharging of the corresponding secondary battery 50 stops.

The ammeter 22 measures a current flowing through wirings 52 that connect the battery assembly 12 to the charger 18. The ammeter 22 also measures a charging/discharging current ZI that flows through all of the secondary batteries 50. Further, the ammeter 22 measures a current HI (or an equalization discharging current) flowing from each secondary battery 50 via the wirings 54. Specifically, the ammeter 22 measures currents IA, IB, . . . , and IN flowing from the secondary batteries 50A, 50B, . . . , and 50N, respectively. The ammeter 22 sends the measurements of the currents I to the ADC 34.

The ADC 34 is connected to the ammeter 22, the voltmeter 24, and the CPU 30. The ADC 34 receives analog data on the currents I and the voltages V from the ammeter 22 and the voltmeter 24, and converts the analog data to digital data. The digital data on the currents I and the voltages V is in the memory 32. The CPU 30 includes a timer function (the functional block 42). The CPU executes an equalization process, which will be described later, using the data on the currents I and the voltages V stored in the memory 32.

2. Equalization Process

Figure 3:
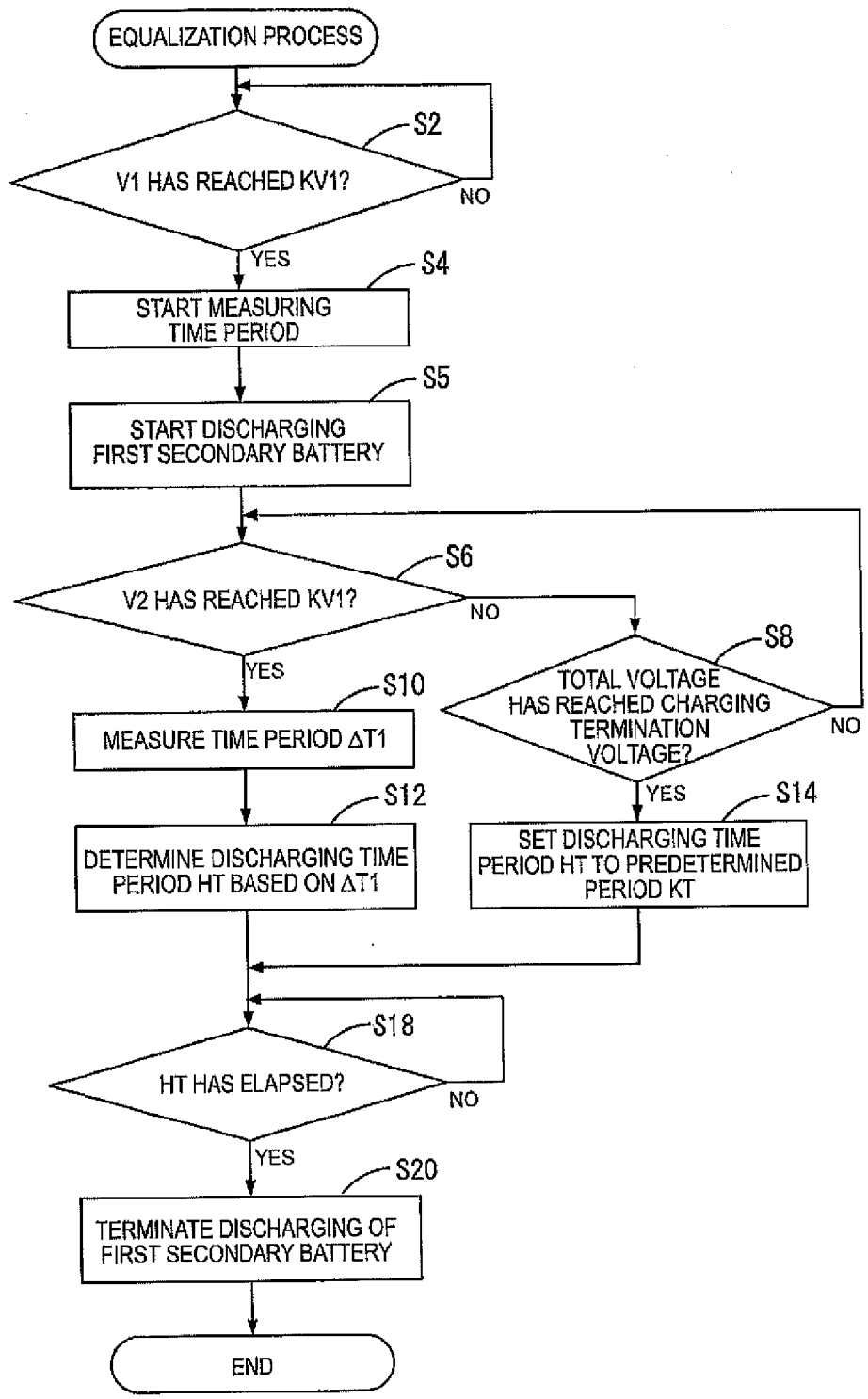
FIG. 3 is a flowchart illustrating an equalization process according to a first embodiment.

The equalization process executed by the BMS 20 during charging the battery assembly 12 will be explained with reference to FIGS. 3 to 5. The equalization process is executed associated with a charging control process for controlling the charging of the battery assembly 12. The equalization process is executed on the battery assembly 12 by the CPU 30 according to a flowchart illustrated in FIG. 3.

When the battery assembly 12 is connected to the charger of the charger/load 18 by a user and power supply from the charger/load 18 to the battery assembly 12 is started, the CPU 30 executes the charging control process and the equalization process. In the equalization process, the CPU 30 first measures the voltage V of each secondary battery 50 and determines whether the voltage V has reached a reference voltage KV. As illustrated in FIG. 4, a voltage that corresponds to the SOC of 90% or higher is determined as the reference voltage KV and referred to as a reference voltage KV1.

If the voltage V of any one of the secondary batteries 50 has reached the reference voltage KV1, the CPU 30 starts measuring an elapsed time period from when the voltage V has reached the reference voltage KV1. If a reference time period ST has elapsed since the start of the time measurement, the CPU 30 starts control of the discharging circuit 26 to discharge the secondary battery 50, the voltage V of which has reached the reference voltage KV1. Specifically, the CPU 30 closes the switch Q in the discharging circuit 26 for the first secondary battery 50 and starts measuring a time period since the switch Q is closed. Further, the CPU 30 measures a time period ΔT from when the voltage V of the secondary battery 50 has reached the reference voltage KV1 to when the voltage V of another one of the secondary batteries 50 has reached the reference voltage KV1. Another one of the secondary batteries may be the one, a voltage of which rises the slowest.

For example, the secondary battery 50, the voltage V of which has reached the reference voltage KV the fastest, may be referred to as a first secondary battery 50. Furthermore, the secondary battery 50, the voltage V of which has reached the reference voltage KV the slowest, may be referred to as a second secondary battery 50. The equalization process for the first secondary battery 50 and the second secondary battery 50 will be explained. The voltage V of the first secondary battery 50 rises the fastest among the secondary batteries 50, that is, the SOC of the first secondary battery is the highest. The voltage V of the second secondary battery 50 rises the slowest among the secondary batteries 50, that is, the SOC of the second secondary battery is the lowest.

Figure 5:
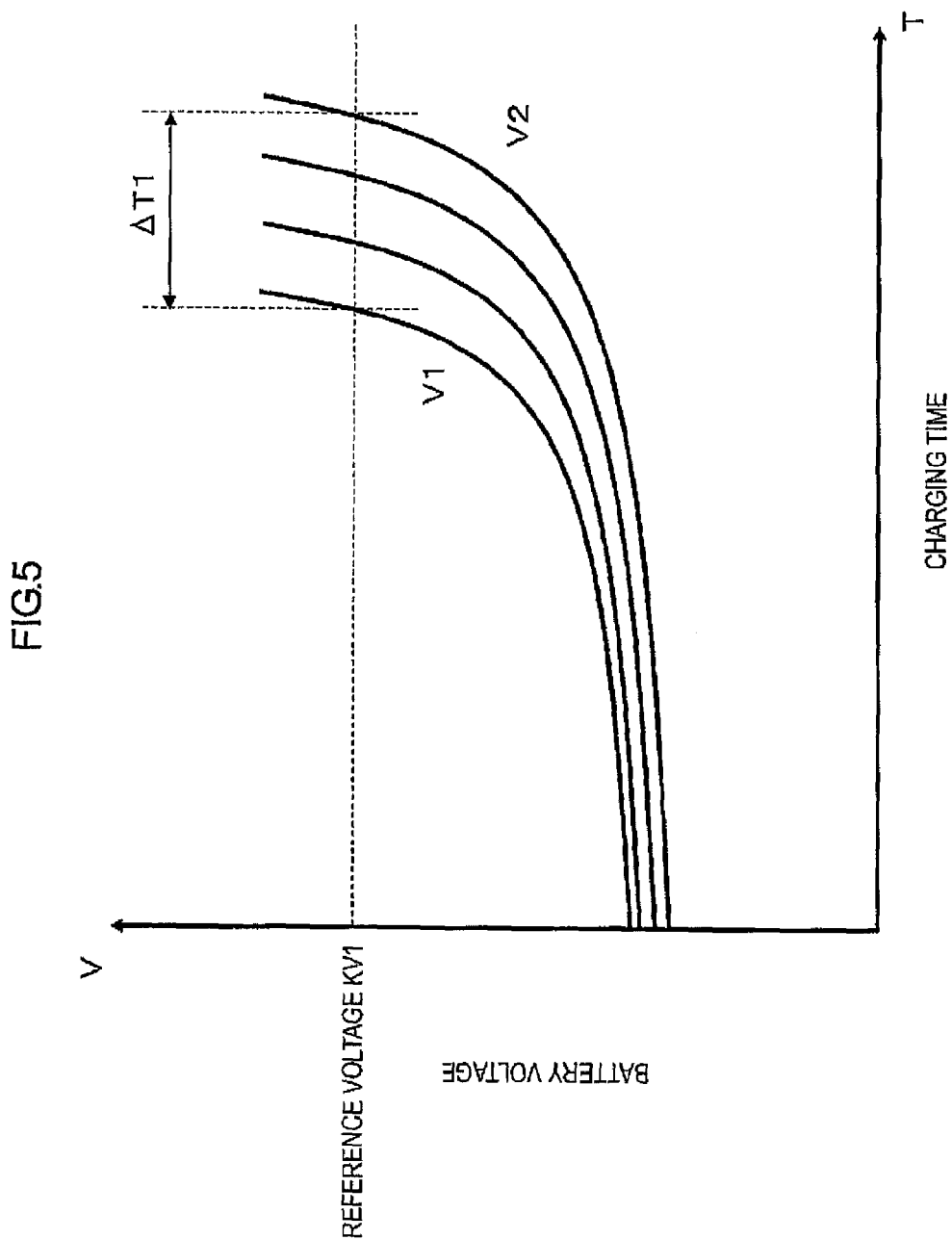
FIG. 5 is another graph illustrating the charging and discharging characteristics of the secondary batteries.

As illustrated in FIG. 5, the voltage of the first secondary battery 50 is V1, the voltage of the second secondary battery 50 is V2, and the time period from when the voltage V1 has reached the reference voltage KV1 to when the voltage V2 has reached the reference voltage KV1 is ΔT1. The configuration of the first secondary battery 50 described in the following sections may be applied to other secondary batteries other than the second secondary battery 50 so that the configurations of all secondary batteries 50 are considered to be described.

The CPU 30 determines whether the voltage V1 of the first secondary battery 50 has reached the reference voltage KV1 (S2). If the voltage V1 has not reached the reference voltage KV1 (NO in S2), the CPU 30 continues monitoring the voltage V1. If the voltage V1 has reached the reference voltage KV1 (YES in S2), the CPU 30 starts measuring a time period (34) and discharging of the first secondary battery 50 (S6). The CPU 30 determines whether the voltage V2 of the second secondary battery 50 has reached the reference voltage KV1.

The CPU 30 monitors the voltage V2 and a total voltage. If the voltage V2 has not reached the reference voltage KV (NO in S6), the CPU 30 determines whether the total voltage of the secondary batteries 50 has reached a charging termination voltage (S8). If the total voltage has not reached the charging termination voltage (NO in S8), the CPU 30 continues monitoring the voltage V2. If the total voltage has reached the charging termination voltage (YES in S8), the CPU 30 sets the discharging time period HT to a predetermined time period KT without measuring the time period ΔT1 (S14).

If the voltage V2 has reached the reference voltage KV (YES in S6), the CPU 30 measures the time period ΔT1 (S10) and determines a discharging time period HT for the first secondary battery 50, the discharge of which has been already started, based on the measured time period ΔT1 (S12). Specifically, the CPU 30 integrates charging currents ZI flowing into the battery assembly 12 for the time period ΔT1. Namely, the CPU 30 multiplies the charging currents ZI by the time period ΔT1 to calculate a capacity difference ΔY1 between the first secondary battery 50 and the second secondary battery 50. The memory 32 stores data on the equalization discharging currents HI (or characteristics) of the discharging circuit 26 corresponding to the first secondary battery 50 in advance. The CPU 30 determines the discharging time period HT by differentiating (or dividing) the capacity difference ΔY1 by the equalization discharging current HI stored in the memory 32. The discharging time period HT may be referred to as an equalization control time period for equalizing the SOCs of the first and second secondary batteries 50.

$$\text{Capacity difference } \Delta Y1 = \text{time period } \Delta T1 * \text{charging current } ZI \tag{1}$$

$$\text{Discharging time period } HT = \text{capacity difference } \Delta Y1 / \text{equalization discharging current } HI \tag{2}$$

If the total voltage has reached the discharging termination voltage before the voltage V2 reaches the reference voltage KV (NO in S6, YES in S8), the CPU 30 sets the discharge time period HT to a predetermined time period KT without measuring the time period ΔT1 (S14).

When a discharging time period HT is set, the CPU 30 determines whether the discharging time period HT has elapsed since the switch Q is closed (S18). If the discharging time period HT has not elapsed (NO in S18), the CPU 30 waits until the discharging time period HT has elapsed. Even if a total voltage of the secondary batteries 50 has reached the discharging termination voltage during the discharging of the first secondary battery 50, the CPU 30 does not terminate the discharging of the first secondary battery 50 and continues the discharging. If the discharging time period HT has elapsed (YES in S18), the CPU 30 terminates the discharging of the first secondary battery 50 (S20) and the equalization process.

3. Effects (1) The BMS 20 starts discharging the first secondary battery 50 when the voltage V1 of the first secondary battery 50 has reached the reference voltage KV1. In the known configuration, the discharging of a secondary battery is started after the voltages of other secondary batteries have reached a reference voltage. In contrast, the discharging of the first secondary battery 50 is started before the voltages of other secondary batteries 50 have reached the reference voltage KV1. Namely, the discharging of the first secondary battery 50 starts earlier in the charging control process performed on the battery assembly 12 in comparison to the known configuration.

The olivine-type lithium-ion iron secondary batteries are used in this embodiment for the secondary batteries 50. Furthermore, the reference voltage KV1 is set to the voltage that corresponds to the SOC of 90% or higher in the final stage of charging. Therefore, the SOC of the secondary battery 50 tends to quickly rise to about 100% after the voltage of the secondary battery 50 exceeds the reference voltage KV1 because only a slight increase in the SOC is required. Furthermore, the voltage V of the secondary battery 50 tends to quickly reach the termination voltage that corresponds to the SOC of about 100%. Therefore, the charging of this secondary battery 50 is more likely to complete before the voltages of other secondary batteries 50 reach the reference voltage KV1.

The BM 20 starts the discharging of the first secondary battery 50 when the voltage V1 of the first secondary battery 50 has reached the reference voltage KV1. Therefore, a sufficient length of the discharging time period is ensured for the first secondary battery 50. Namely, the first secondary battery 50 can be sufficiently discharged without being affected by other secondary batteries 50. Therefore, a problem related uneven SOCs of the secondary batteries 50 under charging is less likely to occur.

(2) The BMS 20 determines the discharging time period HT based on the measured time period ΔT obtained through an actual measurement using the secondary battery 50 and an actual equalization discharging current HI flowing through the discharging circuit 26. Therefore, the discharging time period HT can be accurately determined and thus the secondary batteries 50 can be charged at an equal SOC.

(3) The BMS 20 does not terminate the equalization process unless the discharging of the secondary batteries 50 is completed even if the total voltage of the secondary batteries 50 has reached the charging termination voltage and the charging is completed. In the known configurations, the equalization process is terminated when the charging of all secondary batteries is completed. In comparison to such configurations, a longer discharging time period HT can be ensured. Therefore, the secondary batteries 50 are charged at an equal SOC.

In particular, olivine-type lithium-ion iron secondary batteries are used for the secondary batteries 50 and the reference voltage KV1 is set to a voltage that corresponds to the SOC of 90% or higher in the final stage of charging. A voltage of the olivine-type lithium-ion iron secondary battery tends to sharply rise in the final stage of charging in which the SOC is 90% or higher for a slight increase in the SOC. Namely, the voltage V of the secondary battery 50 tends to sharply rise after the voltage V exceeds the reference voltage KV for a slight increase in the SOC. Therefore, the charging of the battery assembly 12 is more likely to be terminated before the total voltage of the secondary batteries 50 reach the charging termination voltage.

The BMS 20 does not terminate the equalization process unless the discharging of the secondary batteries 50 is completed even if the charging of the battery assembly 12 is completed. Therefore, each secondary battery 50 is properly charged for the determined discharging time period HT and the secondary batteries 50 are charged at an equal SOC.

Second Embodiment

A second embodiment will be described with reference to FIG. 6. An equalization process executed by the charging and discharging system 10 associated with a discharge control process will be explained.

In this embodiment, the reference voltage KV is set to a voltage that corresponds to the SOC of lower than 10% in the late stage of discharging and referred to as a reference voltage KV2 as illustrated in FIG. 4. As in the same manner to the first embodiment, the secondary battery 50, the voltage V1 of which reaches the reference voltage KV the fastest, is referred to as the first secondary battery 50. Moreover, the secondary battery, the voltage V2 of which reaches the reference voltage KV the latest, is referred to as the second secondary battery 50. That is, the voltage V of the first secondary battery 50 drops the fastest (i.e., the SOC is the lowest) and that of the second secondary battery 50 drops the latest (i.e., the SOC is the highest) among the secondary batteries 50. In the following description, the same configurations and the same operations as those of the first embodiment will not be explained.

1. Equalization Process

Figure 6:
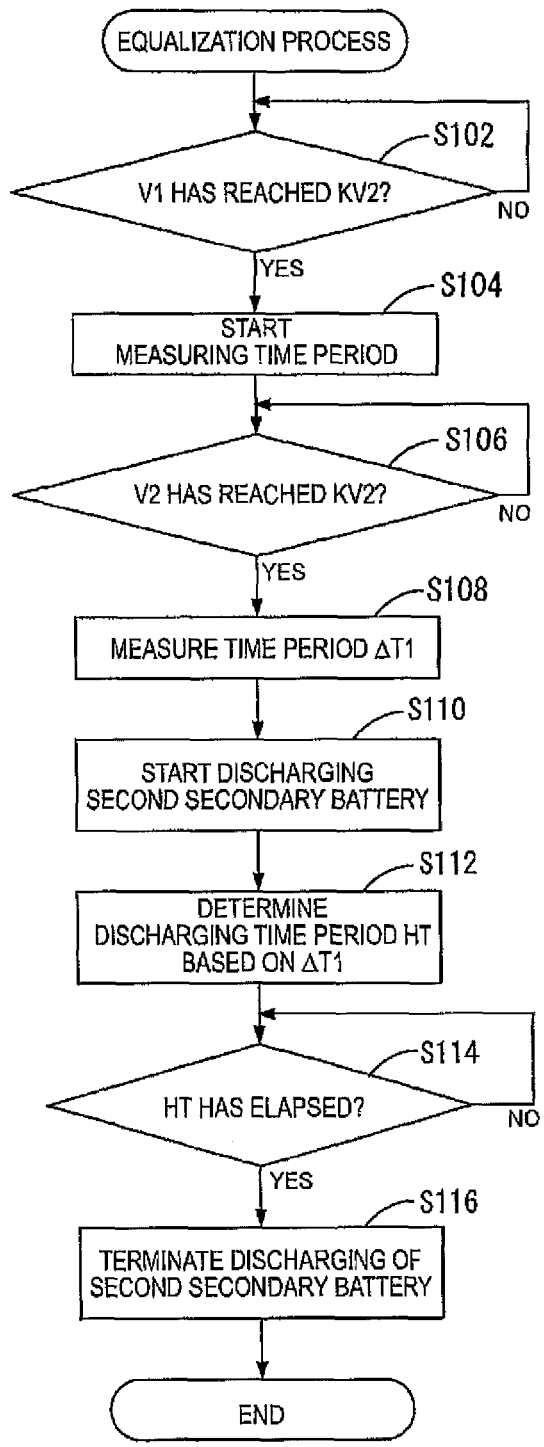
FIG. 6 is a flowchart illustrating an equalization process according to a second embodiment.

The CPU 30 executes the equalization process according to the flowchart illustrated in FIG. 6. The CPU 30 determines whether the voltage V1 of the first secondary battery 50 has reached the reference voltage KV2 (S102). If the voltage V1 has reached the reference voltage KV2 (YES in S102), the CPU 30 starts measuring a time period since the voltage V1 has reached the reference voltage KV2 (S104). The CPU 30 then determines whether the voltage V2 of the second secondary battery 50 has reached the reference voltage KV2 (S106). If the voltage V2 has reached the reference voltage KV2 (YES in S106), the CPU 30 measures a time period ΔT from when the voltage V1 has reached the reference voltage KV2 to when the voltage V2 has reached the reference voltage KV2 (S108). The CPU 30 controls the discharging circuit 26 to discharge the second secondary batteries 50 (S110).

The CPU 30 determines a discharging time period HT, for which the second secondary battery 50 is discharged, based on the measured time period ΔT1 (S112). The CPU 30 determines whether the charging time period HT has elapsed (S114). If the charging time period HT has elapsed (YES in S114), the CPU 30 controls the discharging circuit 26 to terminate the discharging of the second secondary batteries 50 (S116). In this process, the equalization discharging current HI for the second secondary battery 50 is used to determine the discharging time period HT. Other steps are the same as those in the process of determining the discharging time period HT for which the first secondary battery 50 is discharged in the first embodiment. Those steps will not be explained.

2. Effects (1) The EMS 20 starts discharging the second secondary battery 50 when the voltage V2 of the second secondary battery 50 has reached the reference voltage KV2. The discharging of the second secondary battery 50 is started earlier in the discharge control process for the battery assembly 12.

(2) The olivine-type lithium-ion iron secondary batteries are used for the secondary batteries 50, and the reference voltage KV2 is set to the voltage that corresponds to the SOC lower than 10% in the early stage of the discharging. The SOC of the secondary battery 50 tends to decrease to substantially 0% after the voltage of the secondary battery 50 exceeds the reference voltage KV2 because only a slight decrease in the SOC is required to become substantially 0%. Namely, the voltage V of the secondary battery 50 tends to reach the terminal voltage corresponding to the SOC of substantially 0%.

The BMS 20 starts discharging the secondary battery 50 when the voltage V2 of the second secondary battery 50 has reached the reference voltage KV2. Therefore, a problem related to insufficient discharging of the second secondary battery 50 due to conditions of other secondary batteries 50 is less likely to occur. As a result, a problem related to discharging the secondary batteries at unequalized SOCs is less likely to occur.

(3) The BMS 20 determines the discharging time period HT based on the measured time period ΔT obtained through an actual measurement using the secondary battery 50 and the actual equalization discharging current HI flowing through the discharging circuit 26. Therefore, the discharging time period HT can be accurately determined. The secondary batteries 50 are discharged at the equalized SOC.

Third Embodiment

A third embodiment will be described with reference to FIGS. 7 and 8. The charging and discharging system 10 is configured to determine a discharging time period HT for each secondary battery 50 based on discharging time period data stored in a memory 32 in advance. Other configurations are the same as those of the first embodiment and will not be explained.

1. Equalization Process

Figure 7:
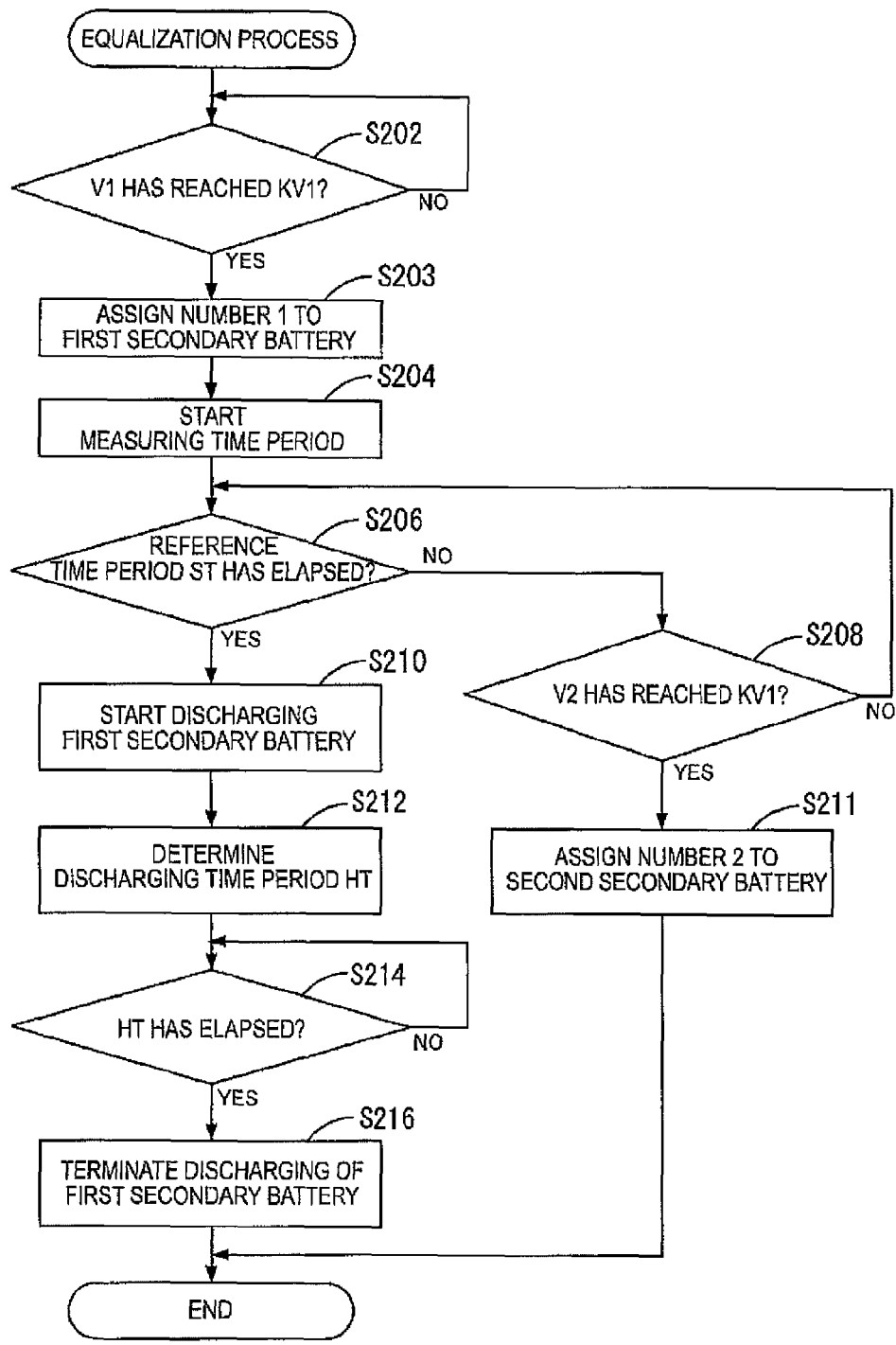
FIG. 7 is a flowchart illustrating an equalization process according to a third embodiment.

The CPU 30 executes the equalization process according to a flowchart illustrated in FIG. 7. The CPU 30 determines whether the voltage V1 of the first secondary battery 50 has reached the reference voltage KV1 (S202). If the voltage V1 has reached the reference voltage KV1 (YES in S202), the CPU 30 assigns number 1 to the first secondary battery 50 according to the sequence and stores the number associated with the first secondary battery 50 in the memory 32 (S203). Then, the CPU 30 starts measuring a time period since the voltage V1 has reached the reference voltage KV1 (S204). The CPU 30 determines whether the reference time period ST has elapsed since the start of measurement of the time period (S206) and whether the voltage V2 of the second secondary battery 50 has reached the reference voltage KV1 (S208). If the voltage V2 has reached the reference voltage KV1 (YES in S208), the CPU 30 assigns number N to the second secondary battery 50 according to the sequence and stores the number associated with the second secondary battery 50 in the memory 32 (S211). Namely, the CPU 30 determines a sequence of the secondary batteries 50 including the first and the second secondary batteries 50 according to time at which the voltages of the secondary batteries 50 reach the reference voltage KV1. The CPU 30 stores the sequential numbers associated with the secondary batteries 50 in the memory 32. The memory 32 temporarily stores the sequential numbers.

If the reference time period ST has not elapsed (NO in S206) and the voltage V2 has reached the reference voltage KV1 (YES in S208), the CPU 30 determines that the voltages of all secondary batteries 50 have reached the reference voltage KV1 within the reference time period ST. Namely, the CPU 30 determines that all secondary batteries 50 are equally charged and terminates the equalization process without discharging the secondary batteries 50.

If the reference time period ST has not elapsed (NO in S206) and the voltage V2 has not reached the reference voltage KV1 (NO in S208), the CPU 30 returns to step S206 and continues monitoring the elapsed time.

If the reference time period ST has elapsed since the start of measurement of the time period (YES in S206), CPU 30 controls the discharging circuit 26 to start discharging the first secondary battery 50 (S210). The discharging time period data stored in the memory 32 includes discharging time periods associated with the sequential numbers. The CPU 30 determines the discharging time period HT for the first secondary battery 50 based on the discharging time period data (S212).

As illustrated in FIG. 1, the discharging time periods HT associated with sequential numbers are stored in the memory 32 of the CPU 30. Specifically, the sequential numbers are associated with the discharging time periods HT as illustrated in FIG. 8 and the relational table illustrated in FIG. 8 is stored in the memory 32. The discharging time period HT becomes longer as the sequential number becomes higher.

The CPU 30 controls the discharging circuit 26 to discharge the first secondary battery 50 for the determined discharging time period HT. The CPU 30 determines whether the discharging time period HT has elapsed (S214). If the discharging time period HT has not elapsed (NO in S214), the CPU 30 continues monitoring the elapsed time (S214). If the discharging time period HT has elapsed (YES in S214), the CPU 30 terminates the discharging of the first secondary battery 50 (S216).

The CPU 30 determines the discharging time periods HT for all secondary batteries 50 based on the relational table stored in the memory 32. The CPU 50 controls the discharging circuit 26 to discharge the secondary batteries 50 for the respective determined discharging time periods HT.

The charging and discharging system 10 charges the battery assembly 12 for multiple times. Namely, the CPU 30 executes the charging control process and the equalization process for multiple times. In every equalization process, the CPU 30 uses the discharging time period data stored in the memory 32.

2. Effects (1) The discharging time periods HT for which the secondary batteries 50 are discharged are determined based on the sequence in which the batteries of the secondary batteries 50 have reached the reference voltage KV1 and the discharging time period data stored in the memory 32 in advance. Therefore, the discharging time period HT for each secondary battery 50 can be easily and promptly determined.

(2) The equalization process is executed for multiple times. In every equalization process, the discharging time periods HT stored in the memory 32 are used. With this configuration, differences in variations in SOC of the secondary batteries 50 and variations in the respective discharging time periods stored in the memory 32 are compensated. Therefore, the secondary batteries 50 can be charged at an equal SOC.

(3) If all secondary batteries 50 reach the reference voltage KV1 within the reference time period ST and the SOCs of all secondary batteries 50 are substantially equal, the BMS 20 does not discharge the secondary batteries 50 using the discharging circuit 26. If the discharging time periods stored in the memory 32 are relatively long and the secondary batteries 50 are discharged for the respective discharging time periods, the SOCs of the secondary batteries 50 may not be equalized. With the configuration of this embodiment, such a problem is less likely to occur.

Fourth Embodiment

Figure 9:
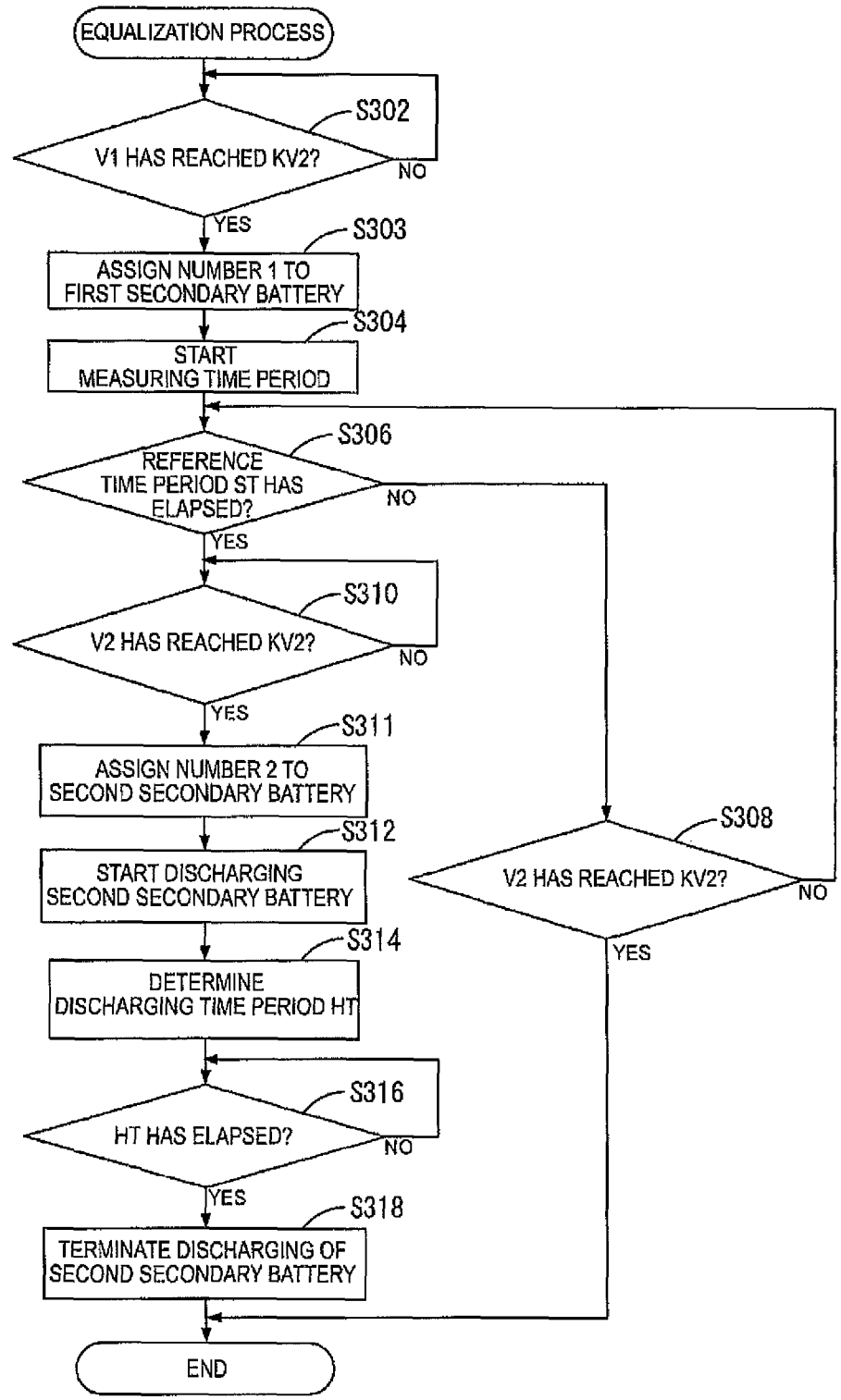
FIG. 9 is a flowchart illustrating an equalization process according to a fourth embodiment.

A fourth embodiment will be described with reference to FIGS. 9 and 10. An equalization process executed by the charging and discharging system 10 associated with a discharge control process will be explained.

The reference voltage KV2 is set to a voltage that corresponds to the SOC of lower than 10% in the final stage of discharging. In this embodiment, the secondary battery 50, a voltage of which has reached the reference voltage KV2 the fastest, is referred to as the first secondary battery 50. The secondary battery 50, a voltage of which has reached the reference voltage KV2 the latest is referred to as the second secondary battery 50. The same configurations as those of the first embodiment and the third embodiment will not be explained.

1. Equalization Process

The CPU 30 determines whether the voltage V1 of the first secondary battery 50 has reached the reference voltage KV2 (S302) If the voltage V1 has reached the reference voltage KV2 (YES in S302), the CPU 30 assigns number 1 to the first secondary battery 50 according to the sequence and stores the number associated with the first secondary battery 50 in the memory 32 (S303). The CPU 30 starts measuring the time period (S304) and determines whether the reference time period ST has elapsed (S306) since the start of the measurement of the time period. If the reference time period ST has not elapsed (NO in S306), the CPU 30 determines whether the voltage V2 of the second secondary battery 50 has reached the reference voltage KV2 (S308). If the voltage V2 has reached the reference voltage KV2 (YES in S308), the CPU 30 terminates the equalization process. If the voltage V2 has not reached the reference voltage KV2 (NO in S308), the CPU 30 continues monitoring the elapsed time. If the reference time period ST has elapsed (YES in S306), the CPU 30 determines whether the voltage V2 of the second secondary battery 50 has reached the reference voltage KV2 (S310). If the voltage V2 has not reached the reference voltage KV2 (NO in S310), the CPU 30 continues monitoring the voltage V2. If the voltage V2 has reached the reference voltage KV2 (YES in S310), the CPU 30 assigns number N to the second secondary battery 50 according to the sequence and stores the number associated with the second secondary battery 50 in the memory 32 (S311). Then, the CPU 30 controls the discharging circuit 26 to start discharging the second secondary battery 50 (S312). The CPU 30 determines the discharging time period HT for the second secondary battery 50 based on the sequential number and the discharging time period data.

The sequential numbers are assigned to the secondary batteries 50 according to the sequence in which the secondary batteries 50 have reached the reference voltage KV2. The sequential numbers are associated with the discharging time periods HT as illustrated in FIG. 10 and the relational table illustrated in FIG. 10 is stored in the memory 32. The discharging time period HT becomes longer as the sequential number becomes lower.

The CPU 30 determines the discharging time period HT for the second secondary battery 50 based on the discharging time period data stored in the memory 32 (S314). The CPU 30 controls the discharging circuit 26 to discharge the second secondary battery 50 for the determined discharging time period. The CPU 30 determines whether the determined discharging time period HT has elapsed (S316). If the determined discharging time period HT has elapsed (YES in S316), the CPU 30 terminates the discharging of the second secondary battery 50. If the determined discharging time period HT has not elapsed (NO in S316), the CPU 30 continues monitoring the elapsed time.

The CPU 30 determines the discharging time periods HT for all secondary batteries 50 based on the relational table stored in the memory 32. The CPU 50 controls the discharging circuit 26 to discharge the secondary batteries 50 for the respective determined discharging time periods HT. The CPU 30 executes the equalization process for multiple times for the battery assembly 12. In every equalization process, the CPU 30 uses the discharging time period data stored in the memory 32.

2. Effects

The discharging time periods HT for which the secondary batteries 50 are discharged are determined based on the sequence in which the batteries of the secondary batteries 50 have reached the reference voltage KV2 and the discharging time period data stored in the memory 32 in advance. Therefore, the discharging time period HT for each secondary battery 50 can be easily and promptly determined Other Embodiments The technical scope of the present invention is not limited to the embodiment described above with reference to the drawings. The following various embodiments are included in the technical scope.

(1) The charging and discharging system 10 may include multiple CPUs and BMSs for measuring the time periods, and executing the equalization process and other processes, respectively. Alternatively, the charging and discharging system 10 may include devices configured to individually perform the above functions.

(2) Batteries having a configuration in which voltages thereof sharply increase or decrease according to a slight increase or decrease in SOC in a certain region may be used. The reference voltage KV may be determined based on the charging and discharging characteristics of each battery.

(3) The CPU 30 may start measuring a time period from the start of the charging control process (or the discharging control process). The CPU 30 may start measuring the time period from the start of the charging control process (or the discharging control process) until the voltage of the secondary battery 50 reaches the reference voltage KV. The elapsed time period ΔT may be based on the measured time period.

(4) The equalization discharging current HI may be calculated based on a resistance of the resistor R in the discharging circuit 26 and stored in the memory 32. Alternatively, the equalization discharging current HI may be measured in advance by an ammeter using the discharging circuit 26 and stored in the memory 32.

(5) The discharging time period HT may be set to the predetermined time period KT if a terminal voltage is set for each secondary battery and a voltage of any one of the secondary batteries 50 has reached the termination voltage.

(6) The discharging time period HT stored in the memory 32 may be updated as needed when the equalization process using the discharging time period HT is executed for multiple times. That is, the CPU 30 determines the sequence of the secondary batteries 50 in which the voltages V have reached the reference voltage KV based on the time periods from when the voltage V1 of the first secondary battery 50 has reached the reference voltage KV to when the voltage V of the secondary battery 50 has reached the reference voltage KV. The discharging time period HT may be updated based on the determined sequence and the time period. The CPU 30 updates the discharging time period HT based on the time period determined in the current equalization process. The CPU 30 uses the updated discharging time period in the next equalization process. With this configuration, the discharging time period stored in the memory 32 can be adjusted as the characteristics of the secondary battery 50 vary due to deterioration. Therefore, the secondary batteries 50 can be charged and discharged at the equal SOC.

(7) The discharging time period HT stored in the memory 32 may be updated such that the time periods stored in the memory 32 are proportional to the time periods for the secondary batteries 50 to which the adjacent sequential numbers are assigned. Alternatively, the discharging time period HT may be updated by using a statistic method.

The invention claimed is:

1. An electric storage device management apparatus for monitoring an electric storage device assembly charged and discharged by a charger/discharger, the electric storage device assembly including a plurality of electric storage devices connected in series, the electric storage device management apparatus comprising:
    a voltmeter configured to individually measure voltages of the electric storage devices, respectively;
    a discharging circuit provided separately from the discharger and configured to discharge the electric storage devices individually;
    a memory storing discharging time period data including discharging time periods associated with sequential numbers; and
    a controller configured to:
        determine whether a voltage of each electric storage device measured by the voltmeter has reached a reference voltage during charging or discharging of the electric storage device assembly;
        assign the sequential numbers to the electric storage devices, respectively, according to a sequence of the electric storage devices determined based on time points at which the voltages of the electric storage devices have reached the reference voltage; and
        control the discharging circuit to discharge the electric storage devices for the respective discharging time periods associated with the sequential numbers.

2. The electric storage device management apparatus according to claim 1, wherein the discharging time periods are set longer for higher ranked sequential numbers when the electric storage device assembly is under charging.

3. The electric storage device management apparatus according to claim 1, wherein the discharging time periods are set longer for the lower ranked sequential numbers when the electric storage device assembly is under discharging.

4. The electric storage device management apparatus according to claim 1, wherein the electric storage device assembly is charged or discharged repeatedly, and the controller controls the discharging circuit to discharge the electric storage devices for a plurality of times using the discharging time periods stored in the memory over the repeated charging or discharging of the electric storage device assembly.

5. The electric storage device management apparatus according to claim 4, wherein the controller is further configured to:
   measure a time period from when a voltage of a first electric storage device of the electric storage devices has reached the reference voltage to when a voltage of a second electric storage device of the electric storage devices has reached the reference voltage; and
   update the discharging time periods stored in the memory based on the measured time period in a current process of charging or discharging, the updated discharging time periods being stored for a next process of charging or discharging.

6. An electric storage device management apparatus for monitoring an electric storage device assembly charged and discharged by a charger/discharger, the electric storage device assembly including a plurality of electric storage devices connected in series, the electric storage device management apparatus comprising:
   a voltmeter configured to individually measure voltages of the electric storage devices, respectively;
   an ammeter configured to measure a current flowing to or from the electric storage device assembly during charging or discharging;
   a discharging circuit provided separately from the discharger and configured to discharge the electric storage devices individually; and
   a controller configured to:
      determine whether a voltage of each electric storage device measured by the voltmeter has reached a reference voltage during charging or discharging of the electric storage device assembly;
      measure a time period from when a voltage of a first electric storage device of the electric storage devices has reached the reference voltage to when a voltage of a second electric storage device of the electric storage devices has reached the reference voltage;
      multiply the current by the time period;
      determine a result of the multiplication as a capacity variation related to the time period;
      divide the capacity variation by an equalization discharging current;
      determine the discharging time period based on a result of the division; and
      control the discharging circuit to discharge the electric storage devices under charging for the determined discharging time period.

7. An electric storage device management apparatus for monitoring an electric storage device assembly charged and discharged by a charger/discharger, the electric storage device assembly including a plurality of electric storage devices connected in series, the electric storage device management apparatus comprising:
   a voltmeter configured to individually measure voltages of the electric storage devices, respectively;
   an ammeter configured to measure a current flowing to or from the electric storage device assembly during charging or discharging;
   a discharging circuit provided separately from the discharger and configured to discharge the electric storage devices individually; and
   a controller configured to:
      determine whether a voltage of each electric storage device measured by the voltmeter has reached a reference voltage during charging or discharging of the electric storage device assembly;
      measure a time period from when a voltage of a first electric storage device of the electric storage devices has reached the reference voltage to when a voltage of a second electric storage device of the electric storage devices has reached the reference voltage;
      multiply the current by the time period;
      determine a result of the multiplication as a capacity variation related to the time period;
      divide the capacity variation by an equalization discharging current;
      determine the discharging time period based on a result of the division; and
      control the discharging circuit to discharge the electric storage devices under discharging for the determined discharging time period.

* * * * *

UNITED STATES PATENT AND TRADEMARK OFFICE
CERTIFICATE OF CORRECTION

PATENT NO. : 9,225,180 B2
APPLICATION NO. : 13/607299
DATED : December 29, 2015
INVENTOR(S) : Takeyuki Shiraishi It is certified that error appears in the above-identified patent and that said Letters Patent is hereby corrected as shown below:

In the claims

1. In line 5, claim 3, replace "are set longer for the lower ranked sequential numbers when" with -- "are set longer for lower ranked sequential numbers when" --

2. In line 8 of claim 6, replace "determine the discharging time period based on a result" with -- "determine a discharging time period based on a result" --

3. In lines 11 and 12 of claim 6, replace "control the discharging circuit to discharge the electric storage devices" with -- control the discharging circuit to discharge the first electric storage device --

4. In line 44 of claim 7, replace "determine the discharging time period based on a" with -- "determine a discharging time period based on a" --

5. In lines 46 and 47 of claim 7, replace "control the discharging circuit to discharge the electric storage devices" with -- "control the discharging circuit to discharge the second electric storage device" --

Signed and Sealed this
Twenty-eighth Day of June, 2016

Michelle K. Lee
*Director of the United States Patent and Trademark Office*